US007367055B2

United States Patent
Comer et al.

(10) Patent No.: US 7,367,055 B2
(45) Date of Patent: Apr. 29, 2008

(54) COMMUNICATION SYSTEMS AUTOMATED SECURITY DETECTION BASED ON PROTOCOL CAUSE CODES

(75) Inventors: Erwin P. Comer, Queen Creek, AZ (US); Mary M. Madine, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 855 days.

(21) Appl. No.: 10/167,304

(22) Filed: Jun. 11, 2002

(65) Prior Publication Data

US 2003/0229803 A1 Dec. 11, 2003

(51) Int. Cl.
*G08B 23/00* (2006.01)
(52) U.S. Cl. .......................................... 726/23; 714/43
(58) Field of Classification Search .............. 726/23, 726/3–5; 455/410; 709/227, 228; 714/43
See application file for complete search history.

(56) References Cited

U.S. PATENT DOCUMENTS

| | | | | |
|---|---|---|---|---|
| 5,182,744 A | * | 1/1993 | Askew et al. | 370/228 |
| 6,032,037 A | * | 2/2000 | Jeffers | 455/404.1 |
| 6,049,712 A | * | 4/2000 | Wallinder | 455/410 |
| 6,253,339 B1 | * | 6/2001 | Tse et al. | 714/47 |
| 6,477,651 B1 | * | 11/2002 | Teal | 726/23 |
| 6,636,491 B1 | * | 10/2003 | Kari et al. | 370/328 |
| 6,745,333 B1 | * | 6/2004 | Thomsen | 726/23 |
| 6,760,444 B1 | * | 7/2004 | Leung | 380/270 |
| 6,895,432 B2 | * | 5/2005 | Ando et al. | 709/220 |
| 6,904,055 B2 | * | 6/2005 | Pichna et al. | 370/467 |
| 7,016,951 B1 | * | 3/2006 | Longworth et al. | 709/224 |
| 7,046,992 B2 | * | 5/2006 | Wallentin et al. | 455/411 |
| 7,051,099 B2 | * | 5/2006 | Ziegler et al. | 709/224 |
| 7,065,067 B2 | * | 6/2006 | Song et al. | 370/388 |
| 7,069,588 B2 | * | 6/2006 | Call et al. | 726/22 |
| 7,080,250 B2 | * | 7/2006 | Calvert | 713/168 |
| 7,107,620 B2 | * | 9/2006 | Haverinen et al. | 726/29 |
| 7,120,934 B2 | * | 10/2006 | Ishikawa | 726/23 |
| 7,134,141 B2 | * | 11/2006 | Crosbie et al. | 726/23 |
| 7,143,442 B2 | * | 11/2006 | Scarfe et al. | 726/23 |
| 7,159,237 B2 | * | 1/2007 | Schneier et al. | 726/3 |
| 2002/0019945 A1 | * | 2/2002 | Houston et al. | 709/224 |
| 2003/0023714 A1 | * | 1/2003 | Ziegler et al. | 709/224 |
| 2003/0084321 A1 | * | 5/2003 | Tarquini et al. | 713/153 |
| 2003/0084322 A1 | * | 5/2003 | Schertz et al. | 713/200 |
| 2003/0091013 A1 | * | 5/2003 | Song et al. | 370/338 |
| 2003/0101359 A1 | * | 5/2003 | Aschen et al. | 713/156 |
| 2003/0167406 A1 | * | 9/2003 | Beavers | 713/201 |
| 2003/0200455 A1 | * | 10/2003 | Wu | 380/270 |
| 2003/0221123 A1 | * | 11/2003 | Beavers | 713/201 |
| 2003/0235174 A1 | * | 12/2003 | Pichna et al. | 370/338 |

\* cited by examiner

*Primary Examiner*—Nasser Moazzami
*Assistant Examiner*—David Garcia Cervetti

(57) ABSTRACT

Using protocol cause codes, a mobile telecommunications network (10) may be pre-configured with a rule set (63) to report the results of the cause codes to an automated security event processing system (50) for security event detection and containment. The cause code information sent from the network nodes (30, 40) to the automated security event processing system will allow for security event correlation across network nodes for the determination and resolution of security breaches.

19 Claims, 2 Drawing Sheets

COMMUNICATION SYSTEMS AUTOMATED SECURITY DETECTION BASED ON PROTOCOL CAUSE CODES

BACKGROUND OF THE INVENTION

The present invention pertains to a communication system and more particularly to a method for pre-configured security event detection using existing protocol cause codes and automated processing of the security events by the communication system.

Any 2G, 2.5G or 3G mobile-based telecommunication systems, such as, Universal Mobile Telecommunications Service (UMTS), General Packet Radio Service (GPRS) or Code Division Multiple Access (CDMA) are vulnerable to security breaches. Such systems typically include a mobile device (phone, computer, PDA . . . ) in order to establish connectivity with the network.

Each mobile-based telecommunications network communicates via network communications protocols. Network protocols differ in each network by technology, but similar in each network are the use of protocol cause codes (sometimes referred to as cause values or reason codes). Protocol cause codes are used as responses to messages passed between network nodes or between a network node and the mobile device. Protocol cause codes are not used for security event detection in today's systems.

Generally security detection and containment is performed by a security administration function. Network operators and security administrators must be knowledgeable enough to know how to configure the network and how to evaluate the security events returned by the network. It takes considerable time and experience for a network operator to become astute to the security administration needs in the network. These are shortcomings of present methodology for security detection and administration.

Therefore what is needed is a more robust method for detecting and processing security events so that actions for controlling and containing security breaches can be performed automatically, swiftly and accurately. The method of this invention calls for the use of protocol cause codes in pre-configured network nodes for the use of security event detection and the automated processing of such events.

DESCRIPTION OF THE PREFERRED EMBODIMENT

In existing telecommunications networks, such as 2G, 2.5G and 3G and beyond, protocol cause codes are used by network nodes for communications.

Figure 1:
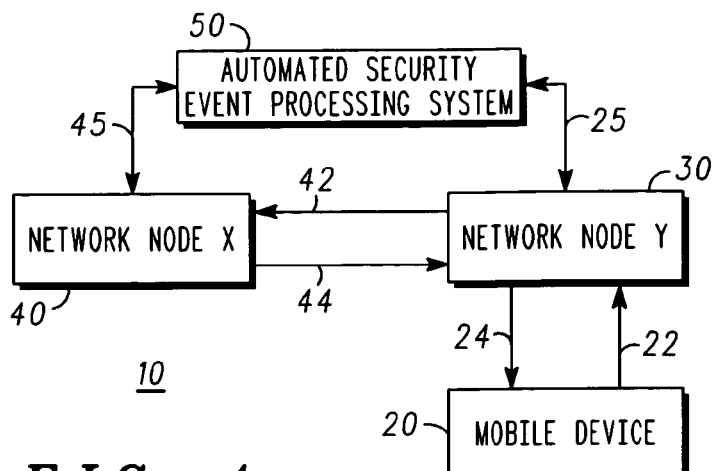
FIG. 1 is a block diagram of a telecommunication network in accordance with the present invention.

FIG. 1 is a block diagram of a security arrangement for a telecommunication system and network 10. Network 10 may include a UMTS (Universal Mobile Telecommunications System), GSM (Group System Mobile), GPRS (General Packet Radio Service), CDMA (Code Division Multiple Access) or iDEN (integrated Digital Enhanced Network) network, for example. Mobile Device 20 is shown coupled to Network Node Y 30 via lead 22 and 24. Lead 22 is used for Requests from the Mobile Device 20 to Network Node Y 30 and Lead 24 is used for Responses from Network Node Y 30 to Mobile Device 20. Mobile Device 20 may be a mobile telephone, mobile Internet tool or other mobile telecommunication device.

As shown in FIG. 1, network nodes are typically interconnected. Network Node Y 30 is connected to Network Node X 40 via leads 42 and 44. Lead 42 is used for Requests from Network Node Y 30 to Network Node X 40 and Lead 44 is used for Responses from Network Node X 40 to Network Node Y 30.

Each of the network nodes Network Node Y 30 and Network Node X 40 is coupled to the Automated Security Event Processing System (ASEPS) 50. Network Node Y 30 is coupled to ASEPS 50 via lead 25. Lead 25 is used to send security alarms from Network Node Y 30 to ASEPS 50. It may also be used by ASEPS 50 to change the pre-configured items in Network Node Y 30. Network Node X 40 is coupled to ASEPS 50 via lead 45. Lead 45 is used to send security alarms from Network Node X 40 to ASEPS 50. It may also be used by ASEPS 50 to change the pre-configured items in Network Node X 40.

ASEPS 50 may be a stand-alone system or a sub-system within an Operations and Maintenance Center (OMC) or any other kind of network manager. The ASEPS 50 processes security events for all network nodes.

Each of the network nodes, Network Node Y 30 and Network Node X 40 are pre-configured to use cause codes to report security events. These cause codes indicate normal message responses that when run through the ASEPS 50 may detect a breach in security. Some cause codes will be pre-configured security events to work in conjunction with pre-configured counters and thresholds for example, when a user such as Mobile Device 20 attempts to connect and there is an authentication failure, a counter may allow three authentication failures before the ASEPS 50 is notified. Using protocol cause codes provides for detection of both obvious and subtle attacks. The information received at ASEPS 50 includes at a minimum, the network node identification indicating where the cause code is generated, the type of message on which it was generated and the cause code value.

Figure 2:
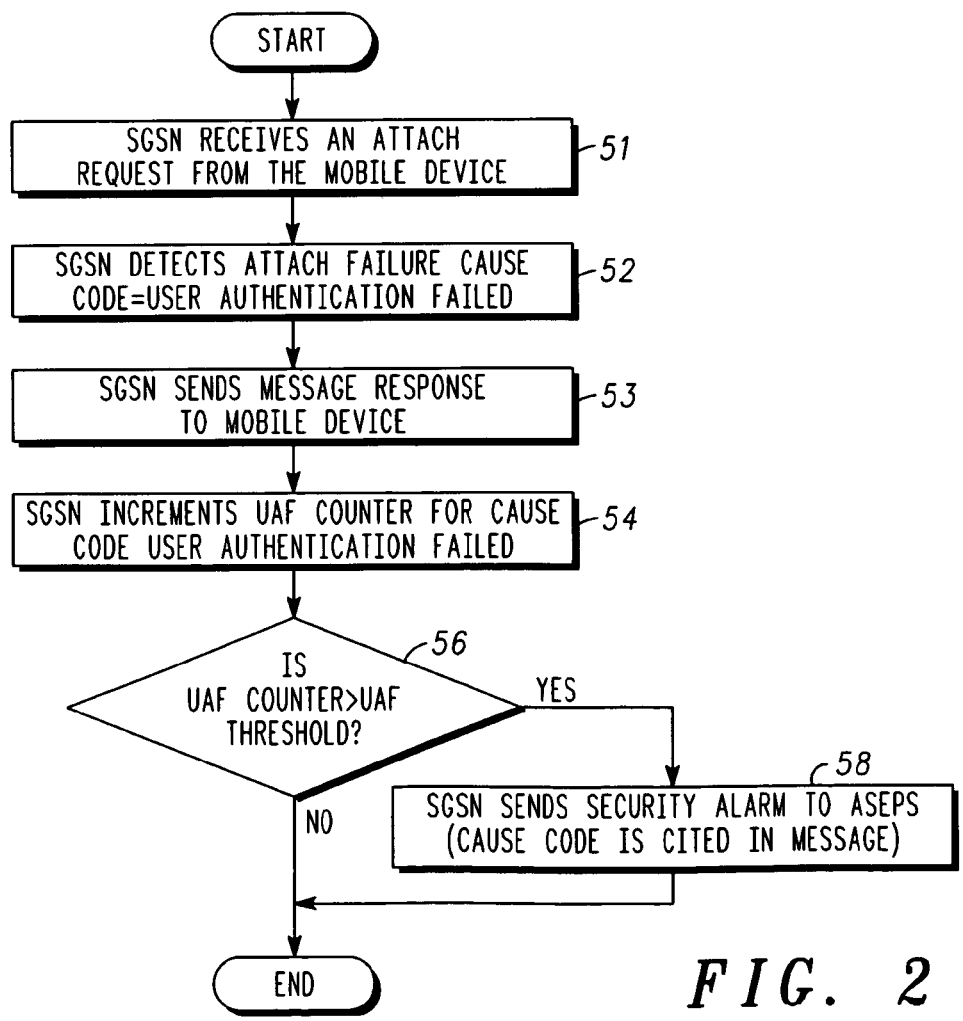
FIG. 2 is a flow chart of a method for use of pre-configured cause codes in network nodes in accordance with the present invention.

As an example of the security event detection arrangement, FIG. 2 will be explained. One of the cause codes that maybe used for security detection in GPRS is "user authentication failed" (UAF). Another cause code, for example, may include one for insufficient available network resources. The user (not shown) is the operator of Mobile Device 20. Mobile Device 20 sends a attach request to SGSN 30, for example, block 51. Network elements such as SGSNs and GGSNs may have cause code thresholds and configurable counters to count the number of "user authentication failed" responses, for example. These user authentication failures may be counted on a per-unit of time basis. For example, they may be counted per second, per minute or per hour. Next, the SGSN detects an attach failure due to "user authentication failed", block 52. Each network node is monitoring cause codes for security purposes as pre-configured to do so. The SGSN 30 sends a message response back to the Mobile Device 20, block 53. The Mobile Device always receives a response. The value of the cause code is listed as part of the response message.

Within each network node such as an SGSN, there may be a counter for each cause code it is watching, for example, in this case "user authentication failed" (UAF). In the present case, the counter for "user authentication failed" (UAF) is incremented, block 54.

Each network node stores its own counters for use with its pre-configured cause codes that it's monitoring. If the counter has exceeded a pre-configured threshold, an alarm is sent to ASEPS 50 via lead 25. In the present example, if the UAF counter is greater than the pre-configured threshold for UAF, block 56 transfers control via the YES path to block 58. Block 58 sends a security alarm message including the value of the cause code to ASEPS 50.

If the UAF threshold was not exceeded, the process is ended via the NO path.

Figure 3:
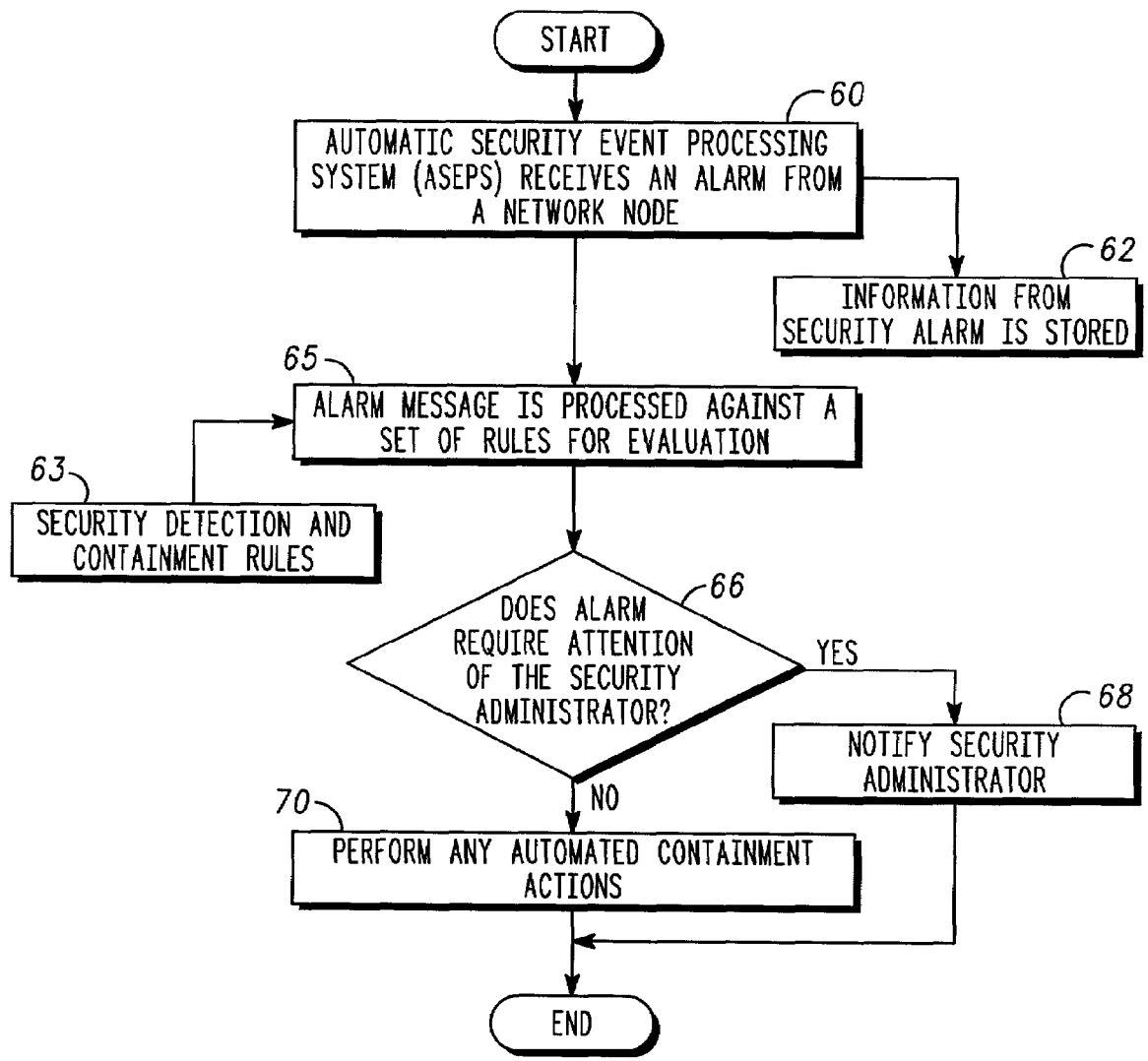
FIG. 3 is a flow chart of a method for use of an automated security event processing system (ASEPS) in accordance with the present invention.

An example of the Automated Security Event Processing System (ASEPS) 50 can be seen in FIG. 3. The ASEPS 50 receives a security alarm from a Network Node. For instance Network Node Y 30 via Lead 25 or Network Node X 40 via Lead 45, as shown in block 60. Information included in the security alarm is saved to an internal file store or database, block 62. The information from the security alarm, for example, Network Node ID, Cause Code, Message Type, Date and Time, ID of Node making request, to name a few, is evaluated against a set of pre stored Security Detection and Containment Rules, block 63, per block 65.

This evaluation causes a decision to be made, as shown in block 66, to determine if the alarm requires the attention of the Security Administrator. If so, then block 66 transfers control to block 68 via the YES path and a Security Administrator (not shown) is notified via a number of methods including, but not limited to: audio alarm, flashing lights, page, phone call, email. If the Security Administrator does not need to be notified, the ASEPS 50 will perform a number of alternate automated containment actions as appropriate, block 70. The alternate actions may include printing a report, lighting a lamp on a display panel, or other man-machine interface, etc. The process is then ended.

As can be seen from the above explanation, the present invention allows for pre-configuration of network nodes to watch specific cause codes. The Network Nodes send information as configured to do so as a security alarm to an Automated Security Event Processing System (ASEPS) 50 for detection and containment of security breaches. The ASEPS 50 can assess the threat to the system as being either an attempt to gain unauthorized access or simply a system fault. The ASEPS 50 may alert the Security Administrator when human intervention is required. As a result, the ASEPS 50 or the System Administrator may perform procedures to protect the system from unauthorized access. The ASEPS 50 may decide whether the information collected can be categorized as a system fault versus a security event. The information may then be sent to a system fault analyzer, not shown. The system fault analyzer may use the information to assess faults and initiate corrective action.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a network, a network security arrangement comprising:
   a mobile device requesting connection to the network;
   at least one network node for coupling to the mobile device, the at least one network node determining at least one security event;
   a processing system coupled to the at least one network node for analyzing the at least one security event; and
   said at least one network node sending a cause code as a security alarm wherein the cause code is sent to the processing system to report the at least one security event.

2. In a network, a network security arrangement as claimed in claim 1, wherein the at least one network node includes a serving General Packet Radio Service (GPRS) support node.

3. In a network, a network security arrangement as claimed in claim 1, wherein, the at least one network node includes a gateway General Packet Radio Service (GPRS) support node.

4. In a network, a network security arrangement as claimed in claim 1, wherein the at least one network node includes a plurality of network nodes, each of the plurality of network nodes being coupled to the processing system.

5. In a network, a network security arrangement as claimed in claim 1, wherein the at least one security event includes a plurality of different security events; and the at least one security event is pre-configured.

6. In a network, a network security arrangement as claimed in claim 1, wherein the mobile device includes a mobile computer.

7. In a network, a network security arrangement as claimed in claim 1, wherein the mobile device includes a mobile internet device.

8. In a network, a network security arrangement as claimed in claim 1, wherein the mobile device includes a mobile telephone.

9. A method for network security comprising the steps of:
   receiving by a network node a request for network services from a mobile device;
   determining by the network node a failure of the request for network services; and
   responsive to the step of determining, sending a cause code as a security alarm to a security event processing system, wherein the cause code being representative of the failure and reporting the failure to the security event processing system.

10. The method for network security as claimed in claim 9, wherein there is further included a step of incrementing by the network node a counter within the network node for the network services failure.

11. The method for network security as claimed in claim 10, wherein there is further included a step of determining whether the counter exceeds a predetermined threshold.

12. The method for network security as claimed in claim 11, wherein if the counter exceeds the predetermined threshold, then sending the cause code to the security event processing system as the security alarm.

13. The method for network security as claimed in claim 9, wherein the step of receiving includes the step of receiving a request from a mobile computer.

14. The method for network security as claimed in claim 9, wherein the step of receiving includes the step of receiving from an internet device.

15. The method for network security as claimed in claim 9, wherein the step of receiving includes the step of receiving from a telephone.

16. The method for network security as claimed in claim 9, wherein the security event processing system includes the steps of:
    receiving the cause code as a security alarm;
    pre-storing a set of security detection and containment rules; and
    evaluating the cause code against the set of security detection and containment rules.

17. The method for network security as claimed in claim 16, wherein the security event processing system further includes the step of determining whether the security alarm indicates a notification to a security administrator.

18. The method for network security as claimed in claim 17, wherein the security event processing system further includes the step of notifying the security administrator, if the step of determining whether the security alarm indicates so.

19. The method for network security as claimed in claim 17, wherein the security event processing system further includes the step of performing an alternate containment action.

* * * * *